United States Patent
Farquhar et al.

(10) Patent No.: US 10,611,124 B2
(45) Date of Patent: Apr. 7, 2020

(54) MULTIPLE LAYERED ALLOY/NON ALLOY CLAD MATERIALS AND METHODS OF MANUFACTURE

(71) Applicant: Fourté International, Sdn. Bhd., Bayan Lepas (MY)

(72) Inventors: James Farquhar, Penang (MY); Darryl McBride, Penang (MY); Tan Bang Hong, Penang (MY); Lye Boon Teng, Penang (MY); Loke Hau Chen, Penang (MY); Chin Peng Tun, Penang (MY)

(73) Assignee: Fourté International SDN. BHD, Bayan Lepas (MY)

( * ) Notice: Subject to any disclaimer, the term of this patent is extended or adjusted under 35 U.S.C. 154(b) by 497 days.

(21) Appl. No.: 14/876,733

(22) Filed: Oct. 6, 2015

(65) Prior Publication Data

US 2017/0095994 A1  Apr. 6, 2017

(51) Int. Cl.
| | |
|---|---|
| *B32B 3/00* | (2006.01) |
| *B32B 15/00* | (2006.01) |
| *B32B 15/01* | (2006.01) |
| *B32B 3/26* | (2006.01) |
| *B23K 20/02* | (2006.01) |
| *B32B 37/00* | (2006.01) |
| *B32B 37/06* | (2006.01) |
| *B32B 38/04* | (2006.01) |

(52) U.S. Cl.
CPC ............ *B32B 15/01* (2013.01); *B32B 3/266* (2013.01); *B32B 37/0053* (2013.01); *B32B 37/06* (2013.01); *B23K 20/02* (2013.01); *B32B 2038/047* (2013.01); *B32B 2307/302* (2013.01); *B32B 2307/54* (2013.01); *B32B 2309/12* (2013.01); *B32B 2311/00* (2013.01)

(58) Field of Classification Search
None
See application file for complete search history.

(56) References Cited

U.S. PATENT DOCUMENTS

| | | | | |
|---|---|---|---|---|
| 2,539,246 A | * | 1/1951 | Hensel | B23K 13/06 228/206 |
| 2,707,323 A | * | 5/1955 | Watson | B23K 20/18 228/118 |
| 2,818,360 A | * | 12/1957 | Porter | B23K 20/2275 428/653 |
| 3,175,893 A | | 3/1965 | Meretsky | |
| 4,151,014 A | | 4/1979 | Charschan et al. | |
| 4,283,464 A | | 8/1981 | Hascoe | |

(Continued)

OTHER PUBLICATIONS

Kobayashi, "Laser Processing", Pergamon Materials Series, 1999, vol. 2, p. 89-118 (Year: 1999).*

(Continued)

*Primary Examiner* — Devang R Patel
(74) *Attorney, Agent, or Firm* — Keith Kline; The Kline Law Firm PC

(57) ABSTRACT

Embodiments of the present technology include clad materials. An example clad material includes a perforated structural substrate, a first ductile substrate roll bonded to the perforated structural substrate in such a way that the first ductile substrate at least partially fills the perforations, and a second ductile substrate roll bonded to the first ductile substrate.

10 Claims, 9 Drawing Sheets

(56) References Cited

U.S. PATENT DOCUMENTS

| | | | |
|---|---|---|---|
| 4,923,100 A | | 5/1990 | Nakamura et al. |
| 4,996,115 A | * | 2/1991 | Eerkes .................. B32B 15/015 |
| | | | 257/E23.112 |
| 5,106,433 A | | 4/1992 | Nakamura et al. |
| 5,359,872 A | | 11/1994 | Nashiki |
| 6,129,993 A | | 10/2000 | Kumamoto et al. |
| 6,150,037 A | | 11/2000 | Saijo et al. |
| 6,427,904 B1 | * | 8/2002 | Groll ...................... B23K 20/04 |
| | | | 228/194 |
| 7,235,910 B2 | | 6/2007 | Decristofaro et al. |
| 9,889,632 B2 | * | 2/2018 | Kaiser ....................... B21B 1/22 |
| 2006/0269774 A1 | * | 11/2006 | Demers ................. B21D 39/03 |
| | | | 428/609 |

OTHER PUBLICATIONS

Written Opinion and Search Report dated Dec. 30, 2016 for PCT Application No. PCT/US2016/053819.

\* cited by examiner

MULTIPLE LAYERED ALLOY/NON ALLOY CLAD MATERIALS AND METHODS OF MANUFACTURE

FIELD OF THE PRESENT TECHNOLOGY

The present technology relates generally to cladding and manufacturing methods, and more particularly but not by limitation, to methods that produce a multiple alloy/non alloy clad layered objects that provide substantial heat transfer properties from materials such as copper and aluminum while combining these thermal materials with stainless steel to give the structure a secondary property of great strength.

SUMMARY

Embodiments of the present technology include a multiple alloy/non alloy clad material, comprising: a perforated single structural substrate; a ductile substrate roll bonded to the perforated single structural substrate in such a way that the ductile substrate completely fills the perforations; and a ductile substrate is then roll bonded to the other side of the structural member or to the face of the other ductile substrate.

In some embodiments, because of the pressure required when forcing the ductile substrate into the perforations of the structural substrate, it may be necessary to introduce a reel to reel etching of the ductile substrate that matches the shapes of the reel to reel perforated openings of the structural substrate. This pre-etching will help combine the two substrates and to prevent distortion of the openings in the structural substrate during the roll bonding process.

Other embodiments of the present technology include a method, comprising: roll bonding a ductile substrate into perforations within a single structural substrate creating a lower ductile surface and a single structural and a ductile upper surface; and roll bonding a ductile substrate to the lower ductile surface. In some embodiments, the roll bonding process can occur simultaneously filling the perforations in the single structural substrate while permanently bonding the three different substrates together as one.

Other embodiments of the present technology include a method, comprising: creating a roll bonded multiple alloy/non alloy clad material by: roll bonding a high strength ductile substrate to a first surface of a single structural substrate, wherein the structural substrate comprises perforations, wherein the high strength ductile-substrate flows into the perforations during roll bonding, creating a single uniform thickness from the two different substrates allowing thermal energy to flow through the structural member.

In some embodiments a roll bonded claim material can be manufactured by: roll bonding a ductile substrate to the surface of the structural substrate while also forcing the ductile material to flow into the perforations of the structural member combining the two substrates to form an inseparable material with a single uniform thickness that will allow thermal energy to pass through the structural substrate within the perforations filled with the ductile material.

In some embodiments a roll bonded claim material can be manufactured by: roll bonding a ductile substrate to the surface of the structural substrate while also forcing ductile material to flow into the perforations of the structural member integrating the two substrates to form an inseparable material with a single uniform thickness that will allow thermal energy to pass through the structural member via the perforations filled with the ductile material. The roll bonded method can also be used to add yet another layer of the same (or different) ductile material to an opposing side of the structural/ductile material to form a layered object with three layers. In some embodiments, the ductile/structural/ductile layer object would incorporate the same ductile material for both sides.

DETAILED DESCRIPTION

In the following description, for purposes of explanation and not limitation, specific details are set forth, such as particular embodiments, procedures, techniques, etc. in order to provide a thorough understanding of the present invention. However, it will be apparent to one skilled in the art that the present invention may be practiced in other embodiments that depart from these specific details.

The present disclosure is directed to multiple alloy/non alloy clad materials. These materials are engineered with one of the layers comprising a material that has high tensile strength also having perforations. This perforated structural substrate layer will become one of the layers in a roll bonded process known as cladding. For example, the structural layer can be roll bonded to one or more ductile substrate layers to create a clad material.

These clad materials will be bonded together permanently as the atomic lattices of the different metals are merged as one with a uniform thickness. The softer ductile material is forced into the perforated holes of the high tensile strength layer giving the new material properties which will add to its strength.

Stated otherwise, the present disclosure is directed to cladded materials. These cladded materials combine a plurality of materials together into a layered configuration. In some embodiments, a cladded material comprises a ductile layer, a structural member layer, and a different ductile layer. In an example configuration a ductile layer is sandwiched or flowed between a different ductile layer and the structural layer during a cold roll bonding process.

The first ductile layer provides an optimal heat transfer substrate, while the structural layer provides structural rigidity. The second ductile layer provides added material thickness while being more lightweight than either the structural layer or the other ductile layer. In sum, the first ductile layer provides high conductivity, the second ductile layer also provides a thermal path, and the structural layer provides both high strength and low cost properties for this multiple alloy/non alloy clad material.

In some embodiments, the structural layer is comprised of a high strength material such as austenitic, ferritic, martensitic, duplex, or steel alloys that would be known to one or ordinary skill in the art with the present disclosure before them. According to some embodiments, the composition of the structural layer should be selected so that this structural layer maintains rigidity even when the structural layer is relatively thin (e.g., thousandths of an inch). Also, the structural layer can be perforated in some embodiments to allow for the creation of ductile thermal paths. Thus, the structural layer can remain rigid even when being fabricated with perforations or other pathways.

These and other advantages of the present technology will be described with reference to the collective drawings.

Figure 1A:
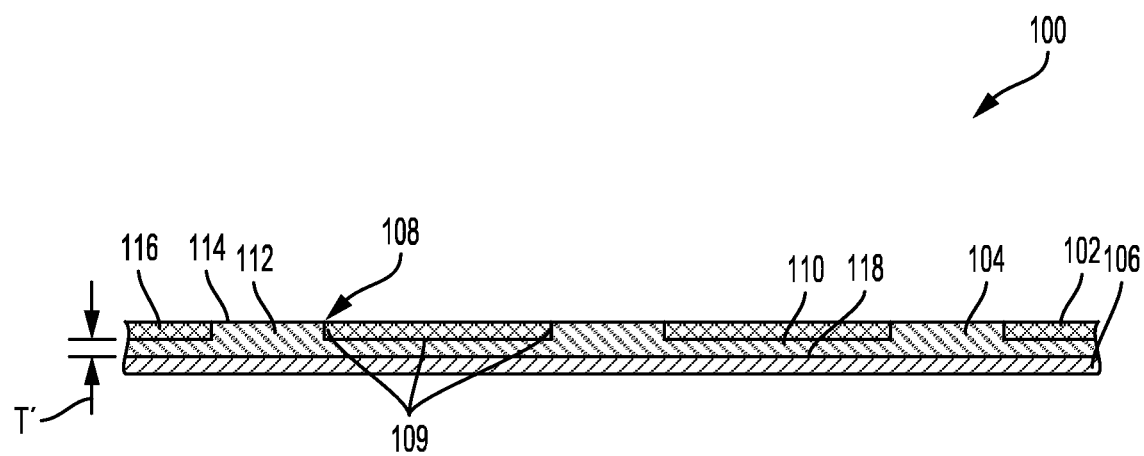
FIGS. 1A, 1B, and 1C are cross sectional views of a plurality of embodiments of clad materials, constructed in accordance with the present technology.
Figure 2:
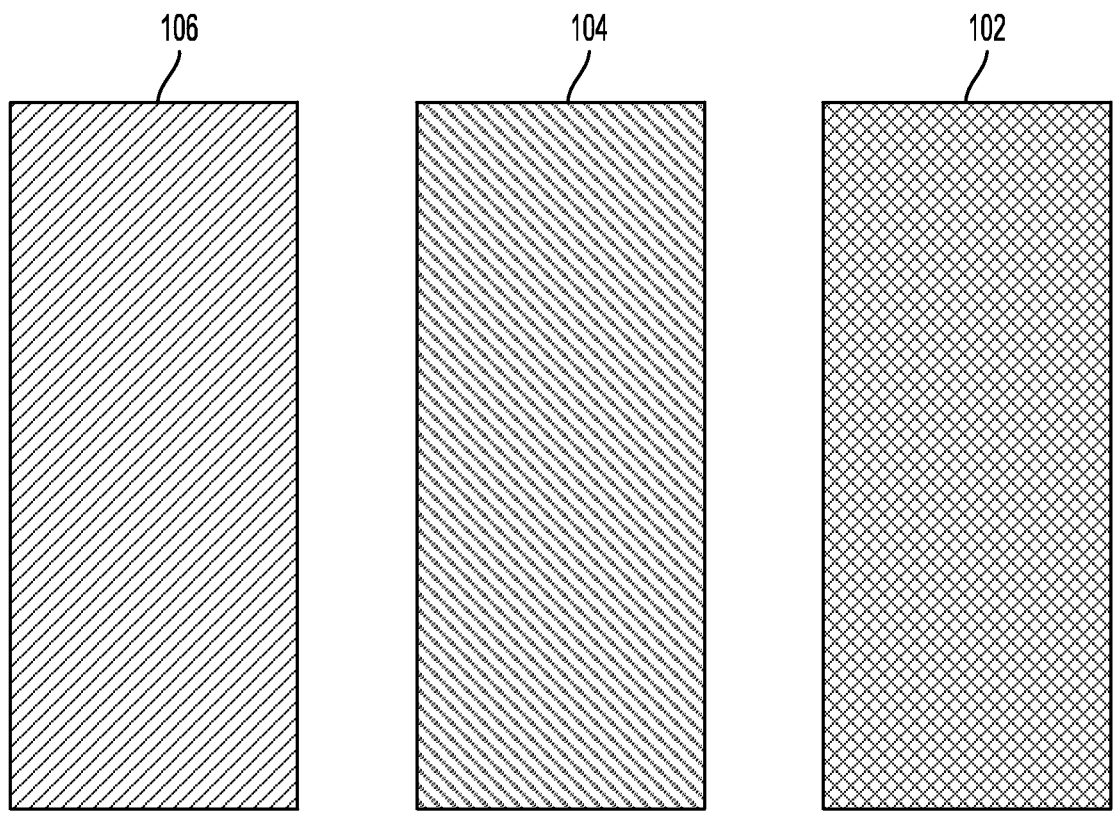
FIG. 2 is a top plan view of three substrates that are used to create the clad material.

Referring now to FIGS. 1A and 2, which collectively illustrate an embodiment of a clad material. FIG. 1A is a cross section of an example clad material 100. FIG. 2 is a plan view of various substrates that comprise the clad material. In some embodiments, the material 100 is created by a roll bonding process, which in some embodiments includes a cold roll bonding process.

According to some embodiments, the material comprises a first layer of a perforated structural substrate 102, a second layer of the first ductile substrate 104, and a third layer of a second ductile substrate 106. The structural material can comprise high strength stainless steel and the ductile substrates/materials can comprise copper and/or aluminum, in one example embodiment. An example ductile material such as copper can be used due to its high thermal transmissivity, while another ductile material can also be used such as aluminum, which provides lightweight structural aspects as well as some thermal transmissivity.

In one embodiment, the structural layer has a layer that is approximately 0.006 inches in height (e.g., thickness). The structural layer contains perforation within the substrate. The perforations, such as perforation 108, create an opening that receives a ductile substrate 104. The ductile substrate is forced to flow into the perforations during a rolling boding process, as will be described in greater detail below.

In some embodiments, the perforations are provided in a uniform pattern across the entirety of the perforated structural substrate 102. The size of the perforations and their distribution across the perforated structural substrate 102 are subject to design requirements such as rigidity. For example, as the number of perforations in the perforated structural substrate 102 increase, the structural rigidity of the perforated structural substrate 102 decreases but would increase the thermal transmissivity of the layered object. The perforations can have any shape, size, or number, again, subject to design considerations.

According to some embodiments, the ductile substrate 104 can be as little as 0.012 inches in height or smaller. A continuous layer or section of this ductile material 110 extends below the perforated structural substrate 102. That is, the roll bonding of the ductile substrate 104 into the perforations of the perforated structural substrate 102 creates a substantially uniform thickness T' of ductile material that extends between the perforated structural substrate 102 and a different ductile substrate 106.

The first ductile substrate 104 flows by roll bonding it into the perforated structural substrate 102. The presence of this ductile material within the perforations creates ductile thermal paths, such as a ductile thermal path 112. The ductile thermal paths provide a thermal pathway for transferring heat received by the second ductile substrate 106 across the material 100.

In some embodiments, the aluminum only partially fills the perforations. In other embodiments, the ductile material fills the perforations such that this material creates a ductile upper surface 114 and is substantially level or co-planar with an upper surface 116 of the perforated structural substrate 102.

As mentioned above, a reel to reel etching of the ductile substrate 104 can be utilized which matches the shapes of the reel to reel perforated openings of the structural substrate. For example, the ductile substrate 104 can be etched at the surfaces 109. The etching of the ductile substrate 104 effectively produces a ductile substrate 104 that is studded with a plurality of protrusions that are configured to mate within the perforations of the structural substrate 102.

This pre-etching can be used when pressure is required to force the ductile substrate 104 into the perforations of the structural substrate 102, which can lead to deleterious deformation of the resultant clad material. This pre-etching will help combine the two (or more) substrates (ductile and/or structural in various combinations and permutations) and to prevent distortion of the perforations in the structural substrate during the roll bonding process.

In some embodiments, the second ductile substrate 106 is roll bonded to a lower surface 118 of the first ductile substrate 104.

While the above descriptions include dimensional aspects of the substrates, it will be understood that the dimensions of these substrates can vary according to design considerations.

A method for creating a multilayer alloy/non alloy clad material can comprise a first step of roll bonding the first ductile substrate onto a perforated structural substrate. Next, the method comprises a step of roll bonding the second ductile substrate onto a lower surface of the first ductile substrate.

In another method the ductile substrate and structural substrate can be roll bonded together in a first process to create a special clad consisting of the first ductile substrate and structural substrate. A second process involves roll bonding of the second substrate onto an upper surface of the first ductile substrate and structural substrate.

In yet another method, roll boding of the first ductile substrate and the roll bonding of the second ductile substrate to the structural substrate occur simultaneously in a single roll bonding process.

Figure 1B:
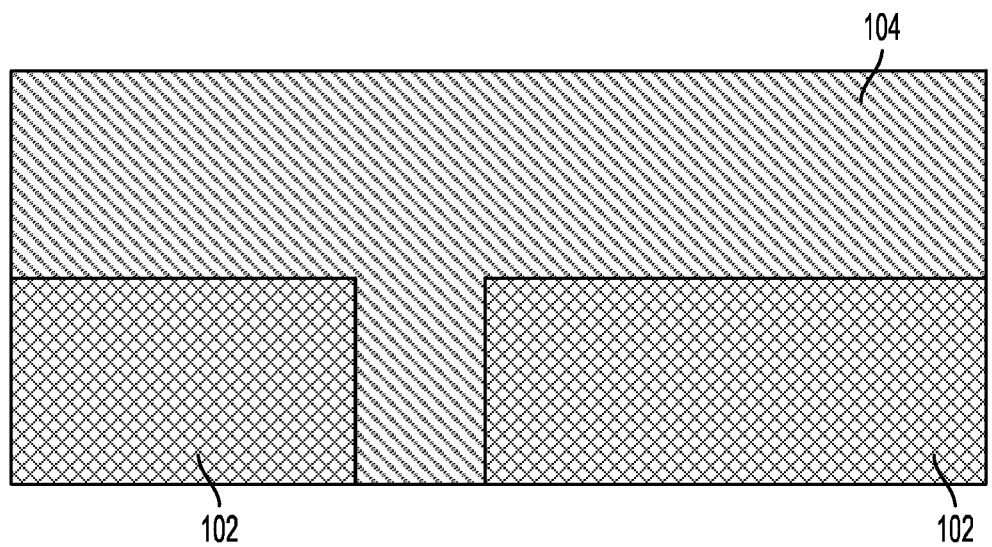

Another example cladded material is illustrated in FIG. 1B that comprises a single ductile substrate 104 and a perforated structural substrate 102. The ductile substrate 104 can be roll bonded to the perforated structural substrate 102 as described above to create a layered object of uniform thickness.

Figure 1C:
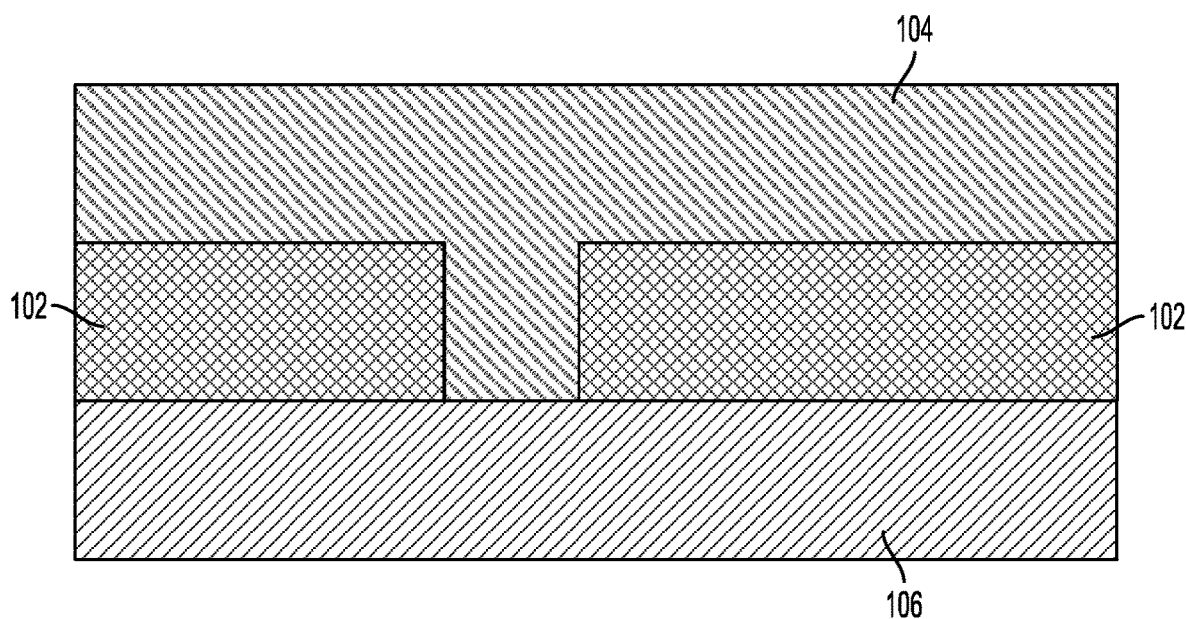

Another example cladded material is illustrated in FIG. 1C that comprises a first ductile substrate 104, a perforated structural substrate 102, and a second ductile substrate 106. The first ductile substrate 104 and second ductile substrate 106 are roll bonded to the perforated structural substrate 102 in one or more roll bonding processes. To be sure, the example cladded material of FIG. 1C can be created using a process as illustrated in FIG. 3B, which is described in greater detail below. In some embodiments, such as in FIG. 1C, the first ductile substrate 104 is a first material such as copper. The second ductile substrate 106 can also comprise copper. In another embodiment, the first ductile substrate 104 and the second ductile substrate 106 are different ductile materials, such as aluminum and/or copper.

When the first and second ductile layers are roll bonded to one another, the layers become inseparable due to the creation of a multilayer bond there between at an atomic level.

The newly formed materials will have unique properties of higher thermal conductivity, higher tensile strength and better electrostatic discharge properties. These materials will be multi-layered and the amount of layers as well as the thickness of the layers will depend on the application. And as mentioned above, the roll bond method will permanently attach the layers (both ductile and structural) together at an atomic level.

Figure 3A:
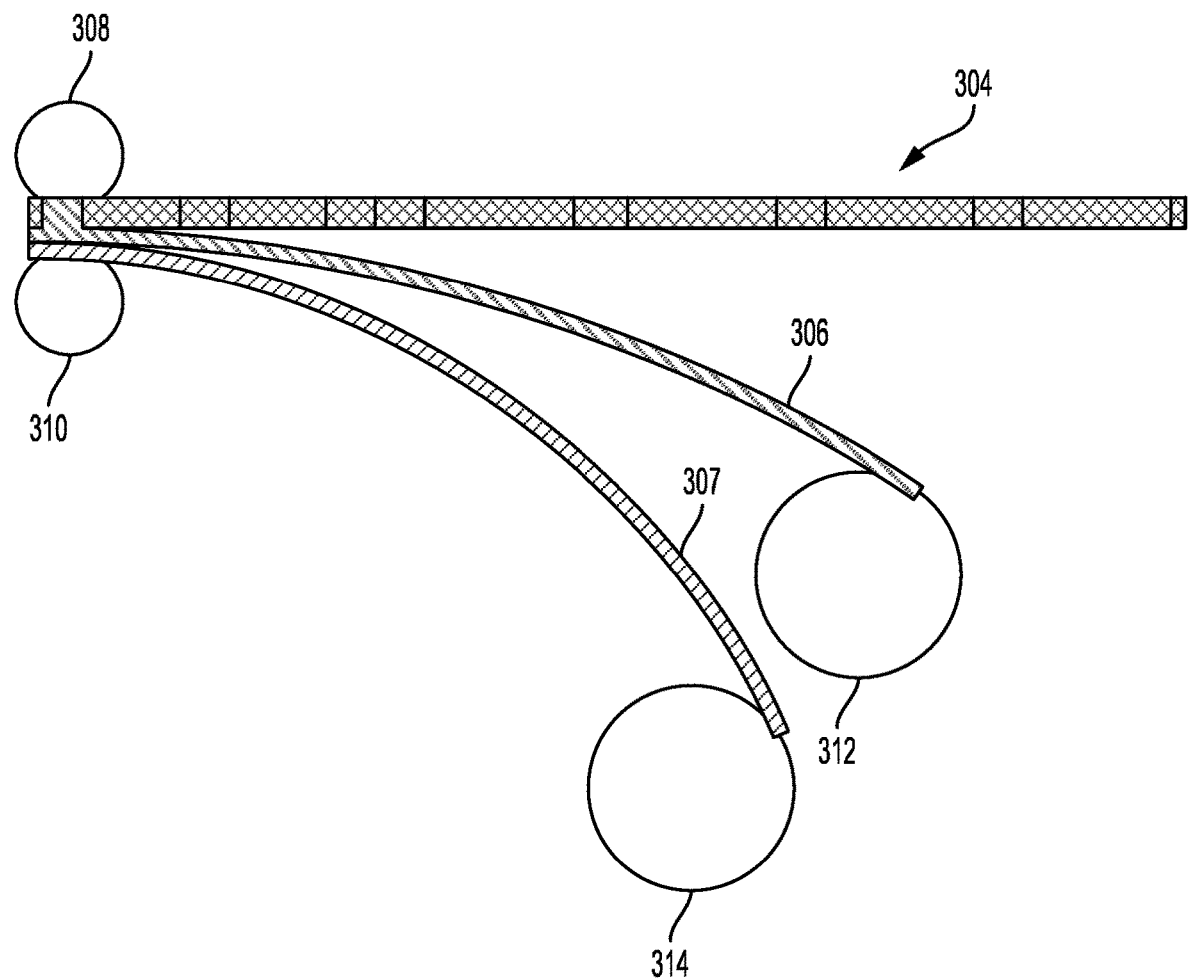
FIG. 3A illustrates a cold roll bonding process for creating an example clad material.
Figure 3B:
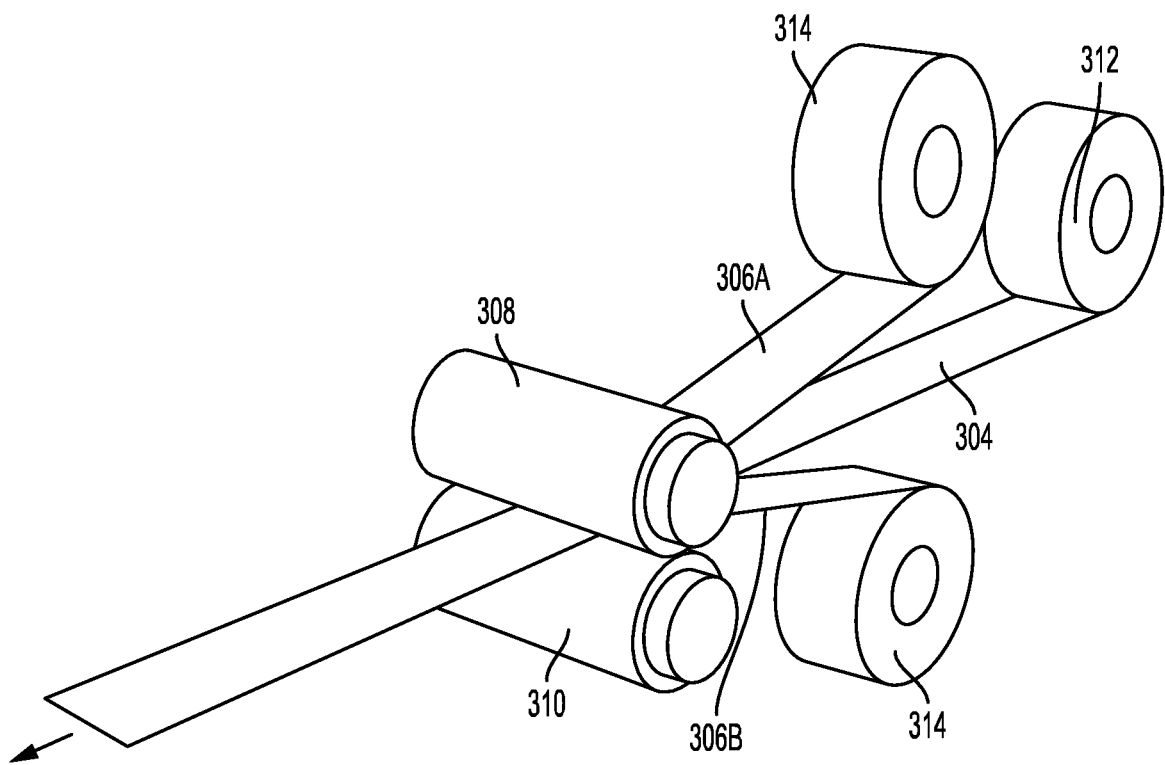
FIG. 3B illustrates another example cold roll bonding process for creating another example clad material that comprises ductile material on both the upper and lower surfaces of a structural material.

As illustrated in FIG. 3A, in yet another embodiment, a cladded material is created by roll bonding a ductile substrate 306, a perforated structural substrate 304, and using the same ductile substrate 307 together at the same time in an example process. For example, a linear section of perforated structural substrate 304 can be fed between two pressure rollers 308 and 310. The ductile substrate 306 is drawn into the pressure rollers 308 and 310 below the perforated structural substrate 304, being fed from a spool 312. The ductile substrate 307 is drawn into the pressure rollers 308 and 310 below the ductile substrate 306. The ductile substrates 306 and 307 are fed from two different spools of copper 314 applying tons of pressure.

In accordance with the present disclosure, a clad material can be utilized to create thin heat dissipating devices for use in electronics such as Smartphones and Tablet devices. Advantageously, the copper clad material can be formed into various shapes using methods of the present disclosure. In one example, the clad material can be annealed prior to forming.

Figure 4:
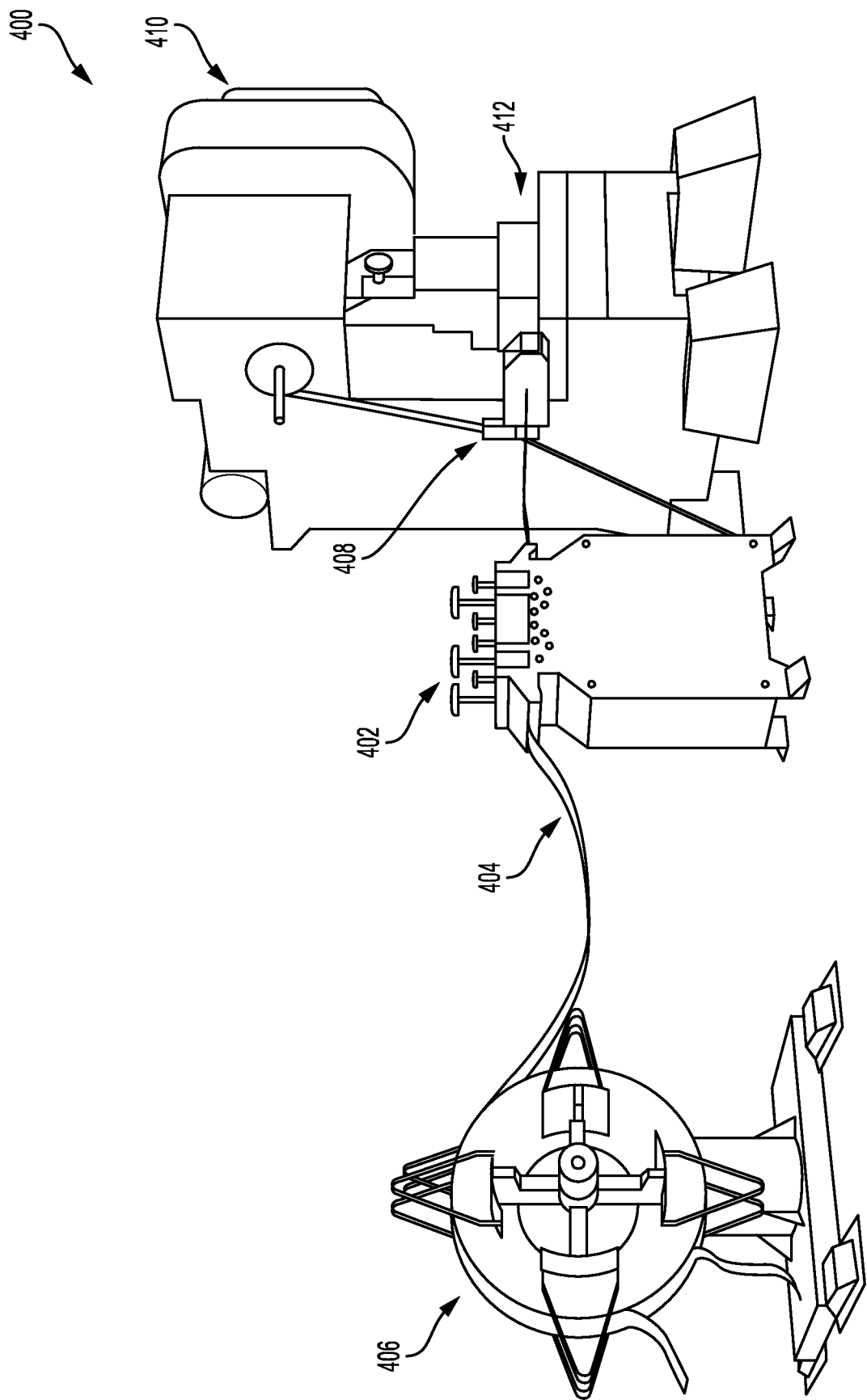
FIG. 4 is a perspective view of an example system for creating a formed object from a clad material.

FIG. 4 illustrates an example system 400 for annealing and stamping clad materials to create clad devices or components. The system 400 generally comprises a straightener 402 that straightens the clad material 404 as it is unspooled from a spool 406. The mutable layer alloy/non alloy clad material comprises any clad material that is manufactured in accordance with the present disclosure.

The clad material 404 is translated in proximity to a laser thermal source such as an annealing laser 408 that subjects the clad material 404 to a laser that heats the clad material 404 according to an annealing pattern. The laser can reach the melting point of the material but is controlled in this process to heat the forming area only to a cherry red before applying tonnage from the stamping tool or hydraulic press.

Figure 5A:
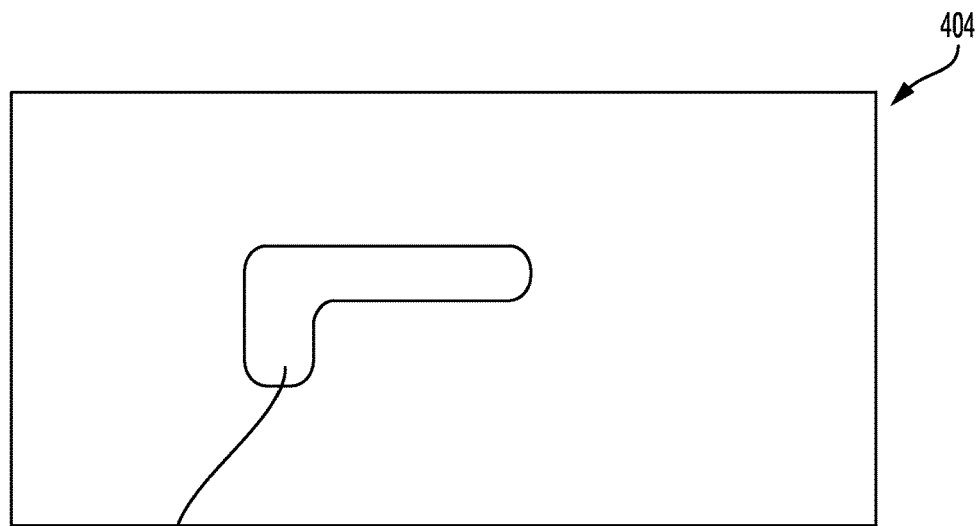
FIG. 5A is a top plan view of a clad material that has been marked with an annealing pattern.

FIG. 5A illustrates an annealing pattern that is selected based on a desired shape of the clad device, which is produced by the system 400 of FIG. 4.

For example, a stamp or press 410 is utilized to form the copper clad material 404 into a clad device. The press 410 applies compressive forces to mold the clad material 404 against a stamping die 412.

In some embodiments, the stainless steel and aluminum surface of the clad material 404 (e.g., the upper surface of the structural substrate that has perforations filled with a ductile material) is faced towards the output of the annealing laser 408.

To be sure, if the clad material 404 were to be subjected to the press 410 and die 412 without any annealing, the structural substrate within the clad material 404 would hinder the forming process due to its high strength nature and resistance to bending or forming and possible separation of the roll bonded materials.

The annealing process of the present technology advantageously makes the structural substrate of the clad material 404 more malleable. A section of the clad material 404 with an annealing pattern 414 to create scaring lines is illustrated in FIG. 5A.

The annealing pattern 414 can be applied to the clad material 404 by the annealing laser 408 as the copper clad material 404 is fed into the press 410 and die 412.

In one embodiment, the annealing laser 408 is computer controlled and mounted beside of the stamping press 410 and will be programmable to perform any two-dimensional or three-dimensional pattern. The annealing laser 408 can be placed approximately six to twelve inches from an entrance of press 410 so that the copper clad material 404 is controlled to a desired temperature before entering the press stamping tool 410/412. This added heat will allow the clad material 404 to bend along the scaring lines.

Figure 5B:
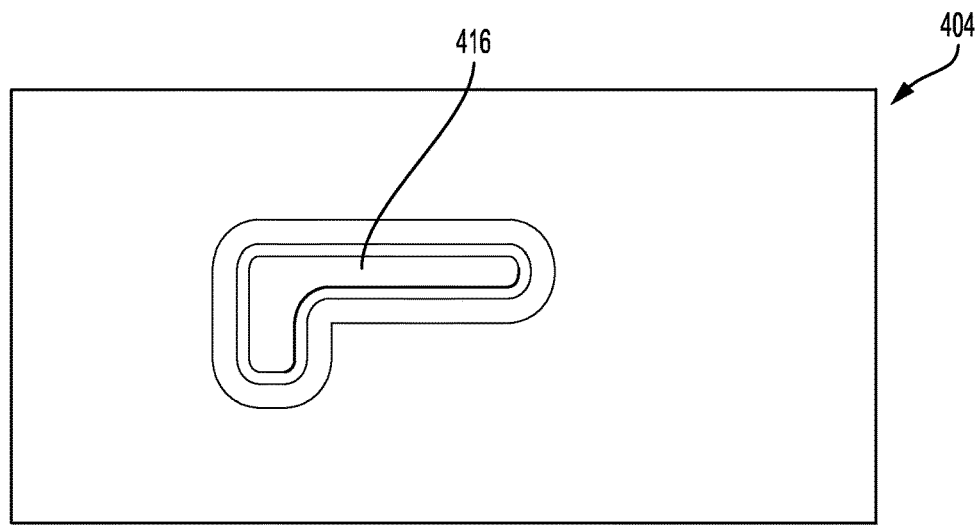
FIG. 5B is a perspective view of a component created by heating the clad material along predetermined lines and quickly processing the heated area to complete the formed object. This will also allow the material to be thinned using heat and pressure.
Figure 5C:
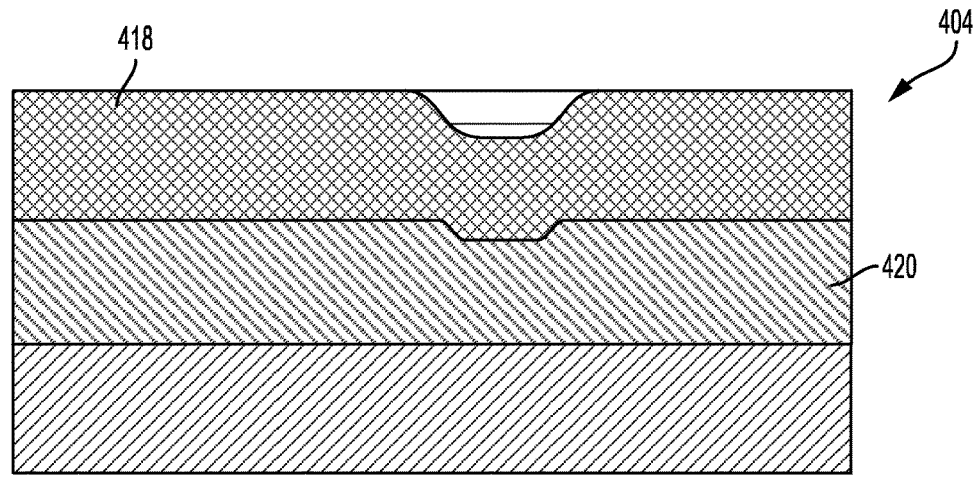
FIG. 5C is a cross sectional view of the formed object of FIGS. 5A and 5B.

In FIG. 5B, the resultant formed object is illustrated. In this example, a recessed area 416 is created in the clad material 404 after applying heat and forming using the stamping press. FIG. 5C is a cross sectional view of the clad material 404, illustrating the deformation of an upper ductile layer 418 and an intermediate structural layer 420.

In some embodiments, rather than (or in addition to) heating/annealing the clad material prior to forming, the clad material can be etched to selectively weaken the clad material along an etching pattern. Etching process contemplated herein can include chemical, laser, or mechanical etching/scarring processes that remove at least a portion of the clad material down to a particular thickness below a surface of the clad material. Again, the etching process weakens the clad material along the etching pattern. In one embodiment, a ductile outer layer of a clad material can be etched. In another embodiment, the ductile/structural layer can be etched.

According to some embodiments, when the ductile material is forced into the perforations of the structural member during a roll bonding process, outlines of the perforations are not overly distorted, which leads to a high quality clad material and/or formed object.

Figure 6:
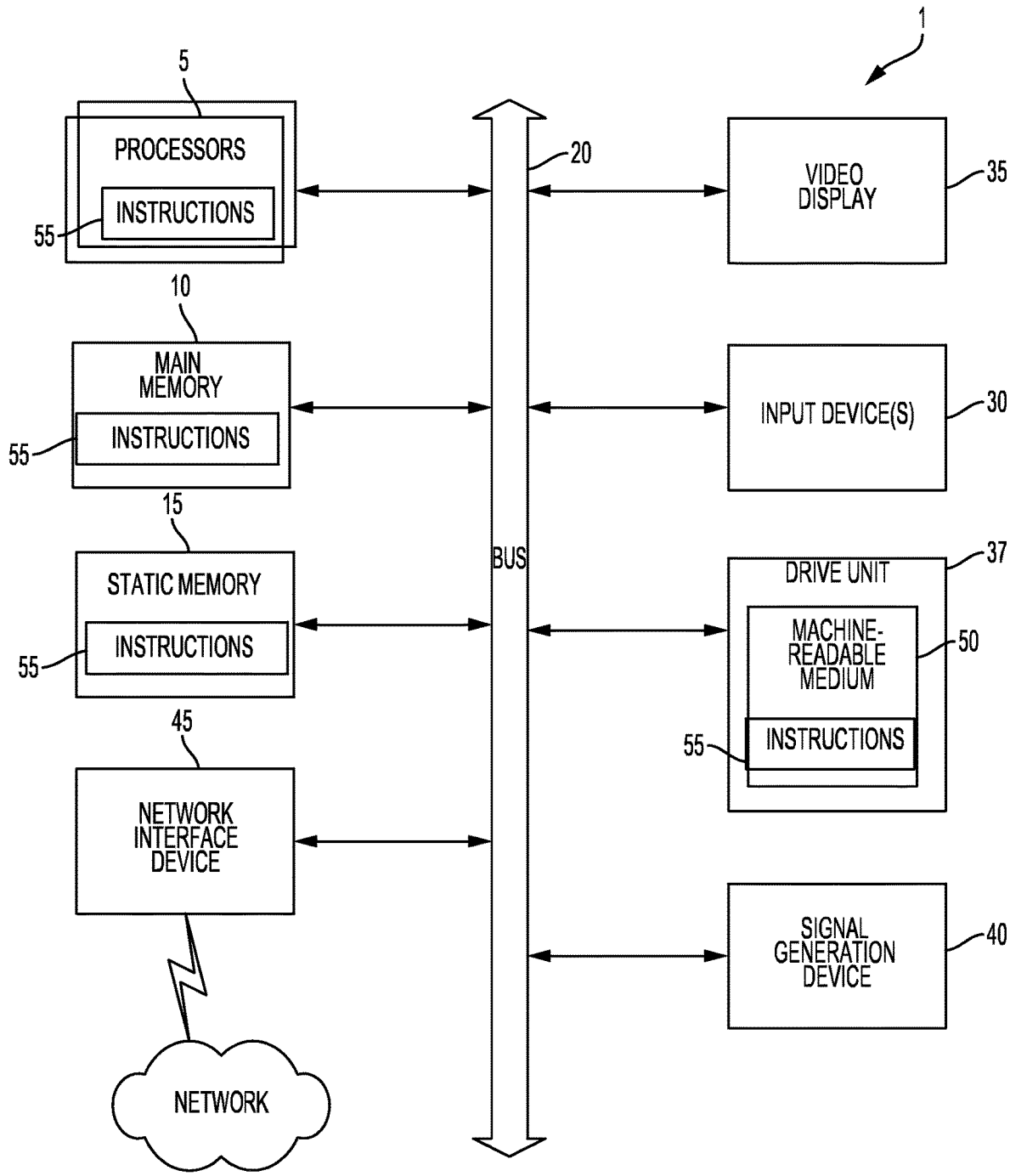
FIG. 6 is a schematic diagram of an example computer system that can be utilized to implement aspects of the present technology.

FIG. 6 illustrates an example computer system 1 that can be utilized to control the press stamping tool 410/412 and the annealing laser 408. That is, the computer system 1 can select annealing patterns and control the annealing laser 408 to apply laser output to the clad material 404 in accordance with the annealing pattern.

A computer controlled laser placed inside the cabinet can heat the material to the correct temperature before it enters the stamping press. The computer also controls the stamping press. The laser will be placed between the straightener and the press.

The computer system 1, within which a set of instructions for causing the machine to perform any one or more of the methodologies discussed herein may be executed. In various example embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a robotic construction marking device, a base station, a personal computer (PC), a tablet PC, a set-top box (STB), a personal digital assistant (PDA), a cellular telephone, a portable music player (e.g., a portable hard drive audio device such as an Moving Picture Experts Group Audio Layer 3 (MP3) player), a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1 includes a processor or multiple processors 5 (e.g., a central processing unit (CPU), a graphics processing unit (GPU), or both), and a main memory 10 and static memory 15, which communicate with each other via a bus 20. The computer system 1 may further include a video display 35 (e.g., a liquid crystal display (LCD)). The computer system 1 may also include an alphanumeric input device(s) 30 (e.g., a keyboard), a cursor control device (e.g., a mouse), a voice recognition or biometric verification unit (not shown), a drive unit 37 (also referred to as disk drive unit), a signal generation device 40 (e.g., a speaker), and a network interface device 45. The computer system 1 may further include a data encryption module (not shown) to encrypt data.

The drive unit 37 includes a computer or machine-readable medium 50 on which is stored one or more sets of instructions and data structures (e.g., instructions 55) embodying or utilizing any one or more of the methodologies or functions described herein. The instructions 55 may also reside, completely or at least partially, within the main memory 10 and/or within the processors 5 during execution thereof by the computer system 1. The main memory 10 and the processors 5 may also constitute machine-readable media.

The instructions 55 may further be transmitted or received over a network via the network interface device 45 utilizing any one of a number of well-known transfer protocols (e.g., Hyper Text Transfer Protocol (HTTP)). While the machine-readable medium 50 is shown in an example embodiment to be a single medium, the term "computer-readable medium" should be taken to include a single medium or multiple media (e.g., a centralized or distributed database and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media, and carrier wave signals. Such media may also include, without limitation, hard disks, floppy disks, flash memory cards, digital video disks, random access memory (RAM), read only memory (ROM), and the like. The example embodiments described herein may be implemented in an operating environment comprising software installed on a computer, in hardware, or in a combination of software and hardware.

Not all components of the computer system 1 are required and thus portions of the computer system 1 can be removed if not needed, such as Input/Output (I/O) devices (e.g., input device(s) 30). One skilled in the art will recognize that the Internet service may be configured to provide Internet access to one or more computing devices that are coupled to the Internet service, and that the computing devices may include one or more processors, buses, memory devices, display devices, input/output devices, and the like. Furthermore, those skilled in the art may appreciate that the Internet service may be coupled to one or more databases, repositories, servers, and the like, which may be utilized in order to implement any of the embodiments of the disclosure as described herein.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" or "according to one embodiment" (or other phrases having similar import) at various places throughout this specification are not necessarily all referring to the same embodiment. Furthermore, the particular features, structures, or characteristics may be combined in any suitable manner in one or more embodiments. Furthermore, depending on the context of discussion herein, a singular term may include its plural forms and a plural term may include its singular form. Similarly, a hyphenated term (e.g., "on-demand") may be occasionally interchangeably used with its non-hyphenated version (e.g., "on demand"), a capitalized entry (e.g., "Software") may be interchangeably used with its non-capitalized version (e.g., "software"), a plural term may be indicated with or without an apostrophe (e.g., PE's or PEs), and an italicized term (e.g., "N+1") may be interchangeably used with its non-italicized version (e.g., "N+1"). Such occasional interchangeable uses shall not be considered inconsistent with each other.

Also, some embodiments may be described in terms of "means for" performing a task or set of tasks. It will be understood that a "means for" may be expressed herein in terms of a structure, such as a processor, a memory, an I/O device such as a camera, or combinations thereof. Alternatively, the "means for" may include an algorithm that is descriptive of a function or method step, while in yet other embodiments the "means for" is expressed in terms of a mathematical formula, prose, or as a flow chart or signal diagram.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

While specific embodiments of, and examples for, the system are described above for illustrative purposes, various equivalent modifications are possible within the scope of the system, as those skilled in the relevant art will recognize. For example, while processes or steps are presented in a given order, alternative embodiments may perform routines having steps in a different order, and some processes or steps may be deleted, moved, added, subdivided, combined, and/or modified to provide alternative or sub-combinations. Each of these processes or steps may be implemented in a variety of different ways. Also, while processes or steps are at times shown as being performed in series, these processes or steps may instead be performed in parallel, or may be performed at different times.

While various embodiments have been described above, it should be understood that they have been presented by way of example only, and not limitation. The descriptions are not intended to limit the scope of the invention to the particular forms set forth herein. To the contrary, the present descriptions are intended to cover such alternatives, modifications, and equivalents as may be included within the spirit and scope of the invention as defined by the appended claims and otherwise appreciated by one of ordinary skill in the art. Thus, the breadth and scope of a preferred embodiment should not be limited by any of the above-described exemplary embodiments.

What is claimed is:

1. A method comprising:
   perforating a structural substrate, the structural substrate including steel;
   etching a ductile substrate with an etching pattern to create protrusions that match the perforations of the structural substrate, the ductile substrate being more ductile than the structural substrate, wherein the etching process comprises one of chemical, laser or mechanical etching that removes at least a portion of the ductile substrate to a particular thickness below a surface of the ductile substrate and weakens the ductile substrate along the etching pattern;
   roll bonding the ductile substrate into the structural substrate with perforations creating a lower ductile surface and a structural member and a ductile upper surface, the protrusions at least partially filling the perforations of the structural substrate, wherein the etching of the ductile substrate is to help combining the structural substrate and the ductile substrate and to prevent distortion of the perforations in the structural substrate; and
   roll bonding a third layer using a different ductile substrate to at least one of the lower ductile surface or the ductile upper surface creating a multilayer bond at an atomic level.

2. The method according to claim 1, wherein the ductile substrate that at least partially fills the perforations forms ductile thermal paths between the ductile substrate and an upper surface of the perforated structural substrate.

3. The method according to claim 2, wherein the ductile substrate fills the perforations to be substantially level with the upper surface of the perforated structural substrate.

4. A method comprising:
   perforating a structural substrate, the structural substrate including steel;
   etching a ductile substrate with an etching pattern to create protrusions that match the perforations of the structural substrate, the ductile substrate being more ductile than the structural substrate, wherein the etching process comprises one of chemical, laser or mechanical etching that removes at least a portion of the ductile substrate to particular thickness below a surface of the ductile substrate and weakens the ductile substrate along the etching pattern;
   roll bonding the ductile substrate into the structural substrate with perforations creating a lower ductile surface and a structural member and a ductile upper surface, the protrusions at least partially filling the perforations of the structural substrate, wherein the etching of the ductile substrate is to help combining the structural substrate and the ductile substrate and to prevent distortion of the perforations in the structural substrate;
   roll bonding a third layer using a different ductile substrate to at least one of the lower ductile surface Of the structural member and ductile upper surface creating a multilayer bond at an atomic level;
   selecting an annealing pattern for transforming the roll bonded clad material into a shape;
   annealing the roll bonded clad material using the annealing pattern; and
   forming the roll bonded clad material into a shape by forming the roll bonded clad material along the annealing pattern.

5. The method according to claim 4, wherein annealing comprises heating the ductile upper surface as well as extending the heat down to the third layer of the structural material.

6. The method according to claim 5, wherein the annealing pattern comprises annealing lines.

7. The method according to claim 4, wherein the roll bonded clad material is annealed using a laser thermal source.

8. The method according to claim 4, wherein forming comprises stamping or hydraulic forming of the annealed and roll bonded clad material with a die or tool.

9. The method according to claim 4, wherein roll bonding the ductile substrate into a perforated structural substrate creating a substantially uniform thickness of ductile material that extends between the perforated structural substrate and the third layer.

10. The method according to claim 4, wherein the roll bonding of the ductile substrate and the roll bonding of the different ductile substrate to the structural substrate occur simultaneously in a single roll bonding process.

* * * * *